United States Patent
Parambil et al.

(10) Patent No.: US 11,360,929 B2
(45) Date of Patent: *Jun. 14, 2022

(54) PRE-REGISTERING MEMORY REGIONS FOR REMOTE DIRECT MEMORY ACCESS IN A DISTRIBUTED FILE SYSTEM

(71) Applicant: Red Hat, Inc., Raleigh, NC (US)

(72) Inventors: Mohammed Rafi Kavungal Chundattu Parambil, Malappuram (IN); Raghavendra Talur, Bangalore (IN)

(73) Assignee: Red Hat, Inc., Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/927,795

(22) Filed: Jul. 13, 2020

(65) Prior Publication Data

US 2020/0341940 A1 Oct. 29, 2020

Related U.S. Application Data

(63) Continuation of application No. 14/994,959, filed on Jan. 13, 2016, now Pat. No. 10,713,211.

(51) Int. Cl.
*G06F 15/173* (2006.01)
*H04L 67/1097* (2022.01)
*G06F 9/54* (2006.01)
*H04L 49/9005* (2022.01)

(52) U.S. Cl.
CPC .......... *G06F 15/17331* (2013.01); *G06F 9/54* (2013.01); *H04L 67/1097* (2013.01); *H04L 49/9005* (2013.01)

(58) Field of Classification Search
None
See application file for complete search history.

(56) References Cited

U.S. PATENT DOCUMENTS

| | | | |
|---|---|---|---|
| 5,740,370 | A | 4/1998 | Battersby et al. |
| 6,061,763 | A | 5/2000 | Rubin et al. |
| 7,233,984 | B2 | 6/2007 | Mohamed et al. |
| 7,281,030 | B1 | 10/2007 | Davis |
| 7,565,454 | B2 | 6/2009 | Zuberi |
| 7,917,597 | B1 | 3/2011 | Lentini |

(Continued)

OTHER PUBLICATIONS

Cheriton, David R. "The V Distributed System", Communications of the ACM, vol. 31, No. 3, Mar. 1988, 20 pages.

(Continued)

*Primary Examiner* — Joshua Joo
(74) *Attorney, Agent, or Firm* — Lowenstein Sandler LLP

(57) ABSTRACT

The subject matter of this specification can be implemented in, among other things, a method that includes pre-registering, at a client device, one or more input/output (IO) buffers for a remote direct memory access (RDMA) interface at the client device. In response to pre-registering the one or more IO buffers at the client device, an application executed by the client device is provided with access to a distributed file system through the RDMA interface. In response to determining that data of a requested file in the distributed file system has been designated for caching, a first IO buffer among the IO buffers is designated as a cache for the data of the file. The data for the file is received via the RDMA interface and from the distributed file system, for the first IO buffer.

14 Claims, 5 Drawing Sheets

(56) References Cited

U.S. PATENT DOCUMENTS

| | | |
|---|---|---|
| 8,131,814 B1 | 3/2012 | Schlansker et al. |
| 8,169,036 B2 | 5/2012 | Kanno et al. |
| 8,706,687 B2 | 4/2014 | Fineberg et al. |
| 8,769,036 B2 | 7/2014 | Frey et al. |
| 8,776,158 B1 | 7/2014 | Cote et al. |
| 9,176,911 B2 | 11/2015 | Davis et al. |
| 2004/0093389 A1 | 5/2004 | Mohamed et al. |
| 2004/0158793 A1 | 8/2004 | Blightman et al. |
| 2004/0162885 A1 | 8/2004 | Garg et al. |
| 2004/0252709 A1 | 12/2004 | Fineberg |
| 2005/0144402 A1 | 6/2005 | Beverly |
| 2006/0256784 A1 | 11/2006 | Feng et al. |
| 2007/0124407 A1 | 5/2007 | Weber et al. |
| 2008/0120463 A1* | 5/2008 | Ashmore ............. G06F 3/0613 711/114 |
| 2008/0235409 A1 | 9/2008 | Ryzhykh |
| 2009/0132760 A1 | 5/2009 | Flynn et al. |
| 2010/0161550 A1 | 6/2010 | Jiang et al. |
| 2011/0106905 A1 | 5/2011 | Frey et al. |
| 2012/0131124 A1 | 5/2012 | Frey et al. |
| 2012/0297140 A1* | 11/2012 | Wu .................... G06F 12/0871 711/133 |
| 2014/0181454 A1 | 6/2014 | Manula et al. |
| 2014/0201306 A1 | 7/2014 | Hefty |
| 2014/0365596 A1 | 12/2014 | Kanevsky et al. |
| 2015/0012606 A1 | 1/2015 | Gadipudi |
| 2015/0039793 A1 | 2/2015 | Rossetti |
| 2016/0026604 A1 | 1/2016 | Pandit et al. |
| 2016/0170910 A1 | 6/2016 | Inamdar et al. |
| 2017/0024269 A1 | 1/2017 | Shuvali et al. |
| 2017/0075856 A1 | 3/2017 | Suzue et al. |
| 2017/0147507 A1 | 5/2017 | Horii et al. |
| 2017/0286294 A1 | 10/2017 | Trika et al. |

OTHER PUBLICATIONS

Hall, Tim; "Direct and Asynchronous 1/0" [retrieved from hltp://web.archive.org/web/20150110005113/http:l/oracle-base.com/articles/misc/direct-and-asynchronous-io.php on Apr. 5, 2016]; Jan. 10, 2015, 2 pages.

Ou et al.; "A Fast Read/Write Process to Reduce ROMA Communication Latency;" Electrical and Computer Engineering Department Tennessee Technological University; Institute of Computing Technology Chinese Academy o Sciences; International Workshop on Networking, Architecture, and Storages, 2006, 7 pages.

IBM Research; "ROMA Model"; [retrieved from: http://web.archive.org/web/20141004204228/http:/iwww.zurich.ibm.com/sys/rdma/model.html on Mar. 29, 2016] Oct. 4, 2014, 2 pages.

Recio, Renato; "A Tutorial of the ROMA Model" [retrieved from: https://web.archive.org/web/20070510153514/hltp://NWW.hpcwire.com/hpc/885757.html]; Sep. 15, 2006, 7 pages.

* cited by examiner

PRE-REGISTERING MEMORY REGIONS FOR REMOTE DIRECT MEMORY ACCESS IN A DISTRIBUTED FILE SYSTEM

RELATED APPLICATIONS

This application is a continuation of U.S. patent application Ser. No. 14/994,959, filed on Jan. 13, 2016, titled "Pre-Registering Memory Regions for Remote Direct Memory Access in a Distributed File System," the entire content of which is incorporated by reference herein.

TECHNICAL FIELD

This instant specification relates to pre-registering memory regions for remote direct memory access in a distributed file system.

BACKGROUND

A distributed file system is a file system that can include multiple physical servers. A logical storage volume in the distributed file system may include multiple storage units at the servers. An operating system at a client device may mount the volume and access it as part of its file system. Applications at the client device may make system calls or perform file operations on the mounted volume using system libraries or application program interfaces (APIs).

DETAILED DESCRIPTION

This document describes systems and techniques for pre-registering memory regions for remote direct memory access (RDMA) in a distributed file system (DFS). Remote direct memory access in a distributed file system is provided using respective RDMA interfaces at a server device and a client device, and involves the use of buffers at a client device. Conventionally, a client device registers a memory region with an RDMA interface for use as a buffer after the client device receives a request for data from the distributed file system.

According to aspects of the present disclosure, a client device pre-registers memory regions to be used as buffers for a remote direct memory access (RDMA) interface at the client device. The client device accesses a distributed file system using the RDMA interface. RDMA interfaces at servers in the distributed file system place data in the buffers at the client device in response to requests for data from the client device. The client device may cache the data so that subsequent requests from the client device for the same data may be served from the cached data at the client device rather than the servers in the distributed file system. In some implementations, the client device copies the data from the buffer to a cache. In some implementations, the client device allocates one of the buffers for use as the cache.

Registering a memory region with an RDMA interface for use as a buffer may take a significant amount of time. By pre-registering the buffers before making a request for data from the distributed file system, the client device may reduce the amount of time needed to begin a transfer of data from servers of the distributed file system to the client device. The pre-registration may also prevent unnecessary copying of the data by having the server device place the data in the buffer at the client device and by having the client device use the data in place within the buffer rather than temporarily placing the data in the buffer and copying the data to a new memory region before being used by the client device. This allows the client device to use the data immediately when the data is received from the server device without waiting for the data to be copied to a separate cache. In addition, subsequent requests for the same data may be provided from the cache without requesting the data again from the servers in the distributed file system, either by copying the data from the buffers to the cache after the data has been used or by using one of the buffers as the cache.

Figure 1:
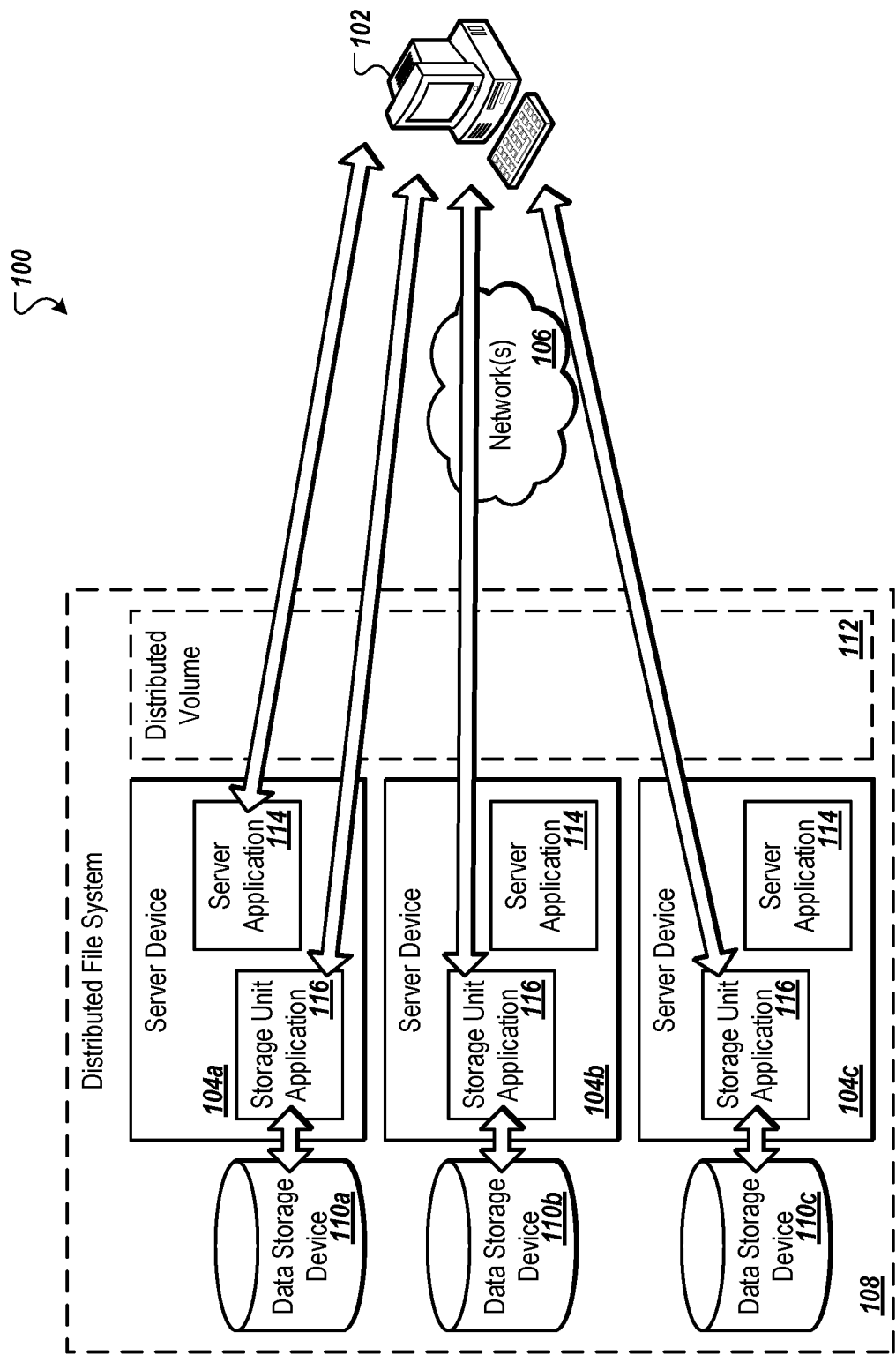
FIG. 1 is a schematic diagram that shows an example of a system for pre-registering memory regions for remote direct memory access in a distributed file system.

FIG. 1 is a schematic diagram that shows an example of a system 100 for pre-registering memory regions for remote direct memory access in a distributed file system. The system 100 includes a client device 102 in communication with multiple server devices 104*a-c* over one or more networks 106. For example, the networks may include an Internet Protocol (IP) network, such as an IP network using Transmission Control Protocol (TCP/IP), and/or a Remote Direct Memory Access protocol network. Each of the server devices 104*a-c* may include or be in communication with one or more data storage devices 110*a-c*. Together the server devices 104*a-c* provide a distributed file system 108. The distributed file system 108 includes at least one distributed volume 112, which includes storage space from one or more of the data storage devices 110*a-c*.

Data in the distributed volume 112 may be distributed across the data storage devices 110*a-c*. For example, a first file for the distributed volume 112 may be placed in the first data storage device 110*a* and a second file for the distributed volume 112 may be placed in the second data storage device 110*b*. Alternatively, the distributed volume 112 may be replicated across the data storage devices 110*a-c*. For example, copies of the two files may be placed on all three of the data storage devices 110*a-c* to provide redundancy in case some of the data storage devices 110*a-c* fail. In another implementation, the two files may be distributed and replicated. For example, the first file in the distributed volume 112 may be placed in the first data storage device 110*a* and the second data storage device 110*b*, while the second file is in another distributed volume that places the second file in two additional data storage devices. In yet another implementation, the distributed volume 112 may be striped across the data storage devices 110*a-c*. For example, separate portions of a file may be placed in the data storage devices 110*a-c* so that the client device 102 may concurrently retrieve the portions from the data storage devices 110*a-c* to reduce the amount of time needed to retrieve the file over the networks 106.

When the distributed volume 112 from the distributed file system 108 is mounted at the client device 102, the client device 102 may be configured to communicate with a server application 114 to retrieve configuration files for the distributed file system 108. Each of the server devices 104*a-c* may include an instance of the server application 114. The server application 114 at each of the server devices 104a-c may generate the configuration files. The server application 114 at each of the server devices 104a-c may communicate with one another to retrieve the configuration files from each other of the server devices 104a-c.

Each of the configuration files corresponds to a storage unit in the distributed volume 112. The distributed volume 112 may include one or more storage units. Each storage unit is created as an export or shared directory from one of the data storage devices 110a-c. Each storage unit corresponds to a storage unit application 116. Each configuration file specifies the distributed volume 112 to which the storage unit belongs as well as the storage unit application 116 that processes requests for data from the storage unit. The client device 102 uses the configuration files to determine which of the storage unit applications to communicate with in order to request data from the distributed volume 112.

The client device 102 pre-registers memory regions for use as buffers at the client device 102 with an RDMA interface at the client device 102. An RDMA interface allows a first device to write data directly to and/or read data directly from a registered memory region at a second device without going through the operating system and/or central processing unit at the second device. For pre-registration, the client device 102 provides the RDMA interface with an identification of a portion of memory at the client device 102 to be used for the buffer, such as a starting address of the buffer and a length of the buffer.

The client device 102 may also specify an access level for the buffer, such as REMOTE READ, REMOTE WRITE, and/or LOCAL WRITE. In some implementations, the client device 102 specifies all three access levels during pre-registration as the level of access that will eventually be needed may not be known at the time the buffer is pre-registered. The pre-registration process registers the buffers with the kernel or operating system at the client device 102 so that the RDMA interface may later access the memory to place data there for a file from the distributed file system 108 without going through the kernel or operating system at the client device 102 and so that the kernel or operating system will not modify or assign the memory for the buffers to another application at the client device 102.

The client device 102 may cache the data that is received from the distributed file system 108. In some implementations, the client device 102 copies the data from the buffer to a cache. This allows the buffer to be reused by subsequent requests to access the distributed file system 108. This also allows subsequent requests for the same data to be provided from the cache without retrieving the data from the distributed file system 108 again, once the data has been copied from the buffer to the cache. In some implementations, the client device 102 dynamically allocates one or more of the buffers for use as the cache. This allows others of the buffers to be reused by subsequent requests to access the distributed file system 108. This also allows requests for the same data to be provided from the cache without retrieving the data from the distributed file system 108 again and without waiting for the data to be copied from the buffer to the cache.

Figure 2:
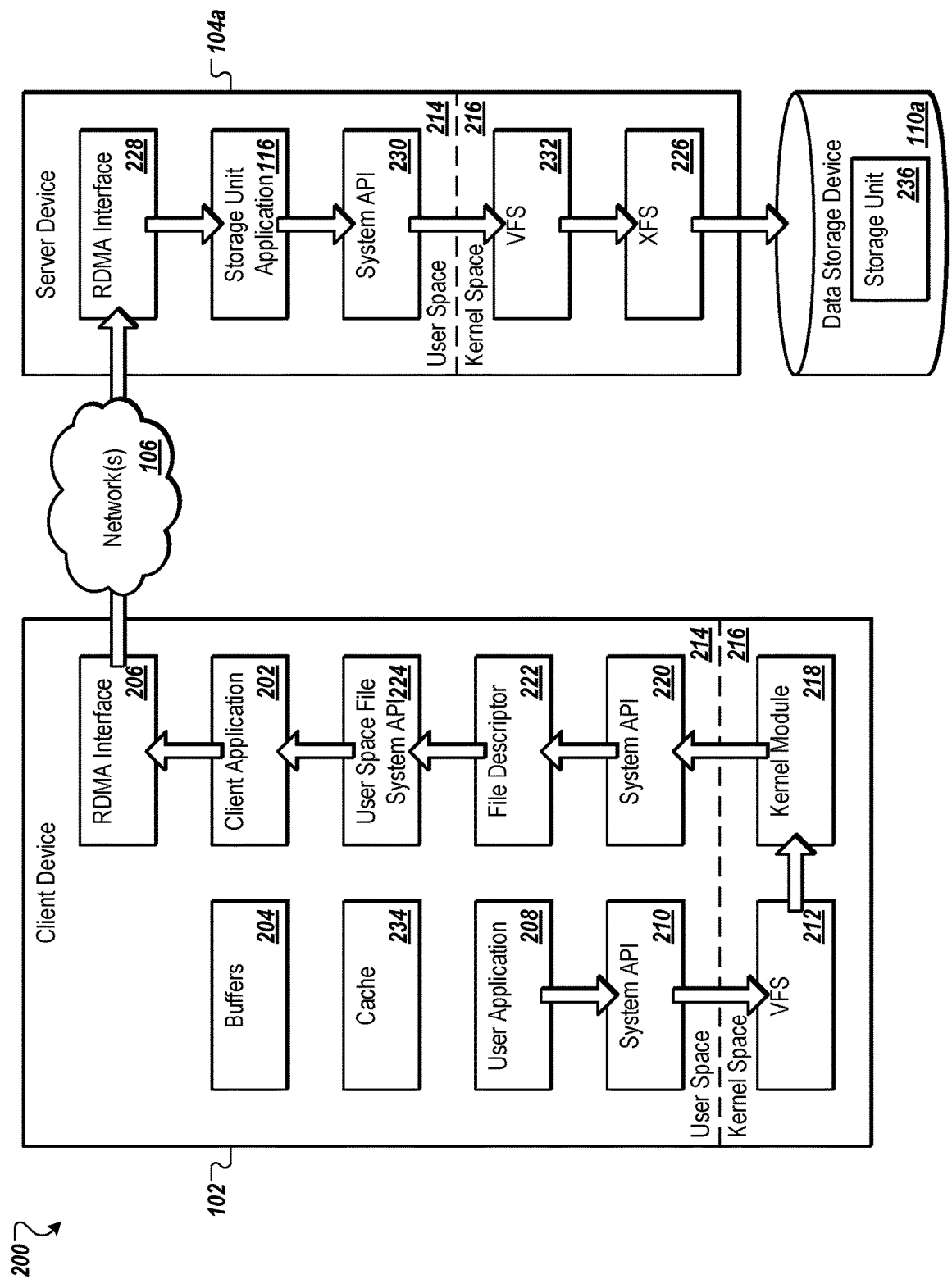
FIG. 2 is a block diagram that shows an example of a system for pre-registering memory regions for remote direct memory access in a distributed file system.

FIG. 2 is a block diagram that shows an example of a system 200 for pre-registering memory for remote direct memory access in a distributed file system. The system 200 includes the client device 102 in communication with the server device 104 over the networks 106. The client device 102 includes a client application 202 that pre-registers one or more buffers 204 with an RDMA interface 206 at the client device 102.

The client device 102 also includes a user application 208 that accesses a file in the distributed file system 108. The client application 202 may create and/or pre-register the buffers 204 during initialization of the RDMA interface 206 prior to providing access to the distributed file system 108 for the user application 208. The user application 208 accesses the file by making a system call or executing a file operation using a system application programming interface (API) 210. The system call or file operation includes an identifier of the file. The system API 210 determines from the identifier that the file is handled by a virtual file system 212 rather than a local file system at the client device 102. For example, the volume, directory, and/or file may be registered with the operating system or kernel at the client device 102 as being handled by the virtual file system 212. The system API 210 passes the system call or file operation request for the file to the virtual file system 212.

The virtual file system 212 is an abstraction layer on top of another file system. The virtual file system 212 allows applications at the client device 102 to access another type of file system other than the local file system, such as the distributed file system 108, in a uniform way. In some implementations, the applications at the client device 102 access the local file system at the client device 102 and the distributed file system 108, through the virtual file system 212, transparently without the applications being aware of the difference between the local file system and the distributed file system 108.

The user application 208 and the system API 210 operate in a user space 214 at the client device 102, while the virtual file system 212 operates in a kernel space 216. The separation between the user space 214 and the kernel space 216 provides for memory protection and may prevent faults from occurring. The user space 214 is an area in memory where application software, such as the user application 208 and the client application 202, and other drivers execute. The kernel space 216 is an area in memory reserved for running a privileged operating system kernel, kernel extensions or modules, and most device drivers (such as the virtual file system 212).

In some implementations, the virtual file system 212 passes the request to the access the file to a kernel module 218. The kernel module 218 is also in the kernel space 216. The kernel module 218 provides access to the virtual file system 212 from the user space 214, such as to the client application 202. For example, the kernel module 218 may use a system API 220, which may be the same as the system API 210, to write information from the request to a file descriptor 222. The client application 202 may use a user space file system API 224 to process the information from the file descriptor 222. The client application 202 may use the information from the file descriptor 222 to identify the file to be accessed from the distributed file system 108.

The client application 202 may include one or more components for processing the request to access the file from the distributed file system 108. For example, the client application 202 may include a component that translates the name or identifier of the file into a hash value that is used to access the distributed file system 108. Each storage unit within the data storage devices 110a-c at the server devices 104a-c may be assigned a range of hash values, such as a range of numbers within a 32-bit hash space. In some implementations, the entire hash space is covered across the storage units without gaps or overlaps across the ranges for the storage units. Each file is assigned a hash value in the hash space by hashing the name or identifier of the file. The file is then located on a storage unit 236 that has the range that includes the hash value of the file.

The client application 202 runs the hashing algorithm from the hash translation component on the file name or identifier to determine the hash value. The hash translation component of the client application 202 then determines which storage unit the file is stored on based on the hash ranges for the storage units. For example, the client application 202 may receive the hash ranges for the storage units in the configuration files received from the server application 114. The client application 202 may compare the hash value to the hash ranges for the storage units to identify which storage unit has the hash range that includes the hash value of the file. The hash ranges may be assigned to storage units based on extended attributes that are stored on directories. As a result, the distribution of hash values within the hash ranges and files within storage units may be directory-specific.

The client application 202 may also include a component that handles file replication. The server application 114 and/or the storage unit application 116 may also include the file replication component. The file replication component uses extended attributes in an extended file system (XFS) 226 to keep track of the file operations. The extended file system 226 allows the extended attributes to be stored for files in a virtual file system 232 at the server device 104*a*. The file replication component replicates data across the storage units, such as when the distributed volume 112 is configured to be replicated across storage units in the data storage devices 110*a-c*. The file replication component maintains replication consistency (e.g., data across the storage units is the same, even where there are operations happening on the same file and/or directory in parallel from multiple user applications and/or mount points). The file replication component may also provide a way of recovering data in case of failures as long as there is at least one storage unit which still has the correct data. Within the client application 202, the file replication may duplicate the file operation to be performed on the file, such as writing to the file, attributes of the file, creating the file, deleting the file, or otherwise modifying the file.

The client application 202 may also include a protocol component that communicates directly with the storage unit 236. The client application 202 may include one protocol component for each storage unit. Each protocol component may execute within a separate processing thread within the client application 202. The protocol component sends the requested file operation for the file to an RDMA interface 228 at the server device 104*a* that hosts the data storage device 110*a* and the storage unit 236 where the hash translation component determined that the file is stored.

The storage unit application 116 for the storage unit 236 at the server device 104*a* where the file is located processes the requested system call or file operation from the client device 102. The storage unit application 116 makes a corresponding system call or executes a corresponding file operation using a system API 230. The system API 230 may determine that the file is handled by the virtual file system 232 at the server device 104*a*. For example, the volume, directory, and/or file may be registered with the operating system or kernel at the server device 104*a* as being handled by the virtual file system 232. The virtual file system 232 may then process the system call or file operation on the file in the storage unit 236 at the server device 104*a*. The system call or file operation may include setting extended attributes for the file or a directory of the file in the extended file system 226.

The server device 104*a* may include the user space 214 and the kernel space 216. The storage unit application 116 may execute within the user space 214. The virtual file system 232 and the extended file system 226 may operate within the kernel space 216. The storage unit application 116 may access the virtual file system 232 and/or the extended file system 226 from the user space 214 using a kernel module at the server device 104*a* in a manner similar to the manner in which the client application 202 accesses the virtual file system 212 at the client device 102.

In the case of a request where the system call or file operation is a request to read data from the file, the storage unit application 116 may access the file through the virtual file system 232 and use the RDMA interface 228 to send the data for the file to one of the buffers 204 at the client device 102 that was identified in the request from the client application 202. The client application 202 may include a caching component. The caching component may be configured to cache the data for the file in a cache 234 in memory at the client device 102, such as when the file, the directory for the file, or the volume for the file have been specified as being cacheable. In some implementations, the caching component copies the data from the buffer into the cache 234. Alternatively, if the caching component determines that the data for the file is to be cached (e.g., according to a set of rules that define which files may be cached), then the caching component may designate one of the buffers 204 for caching and send the address of the designated buffer to the storage unit application 116 at the server device 104*a*. The storage unit application 116 may then place the data for the file directly in the buffer for the cache 234.

In some implementations, the buffers 204 may receive data for files from multiple ones of the server devices 104*a-c* concurrently. In some implementations, all of the buffers 204 may be in use either for caching or for RDMA read/write operations with the server devices 104*a-c* in the distributed file system 108 that are still pending. The client application 202 may register additional memory regions to be used as buffers for the RDMA interface 206 after a request to access a file has been received in response to determining that there are no pre-registered buffers available.

Figure 3A:
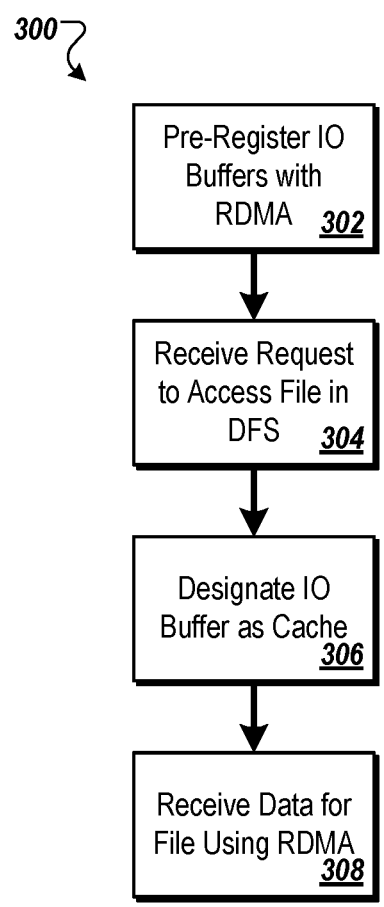
FIGS. 3A-B are flow charts that show examples of a first process and a second process for pre-registering memory regions for remote direct memory access in a distributed file system.
Figure 3B:
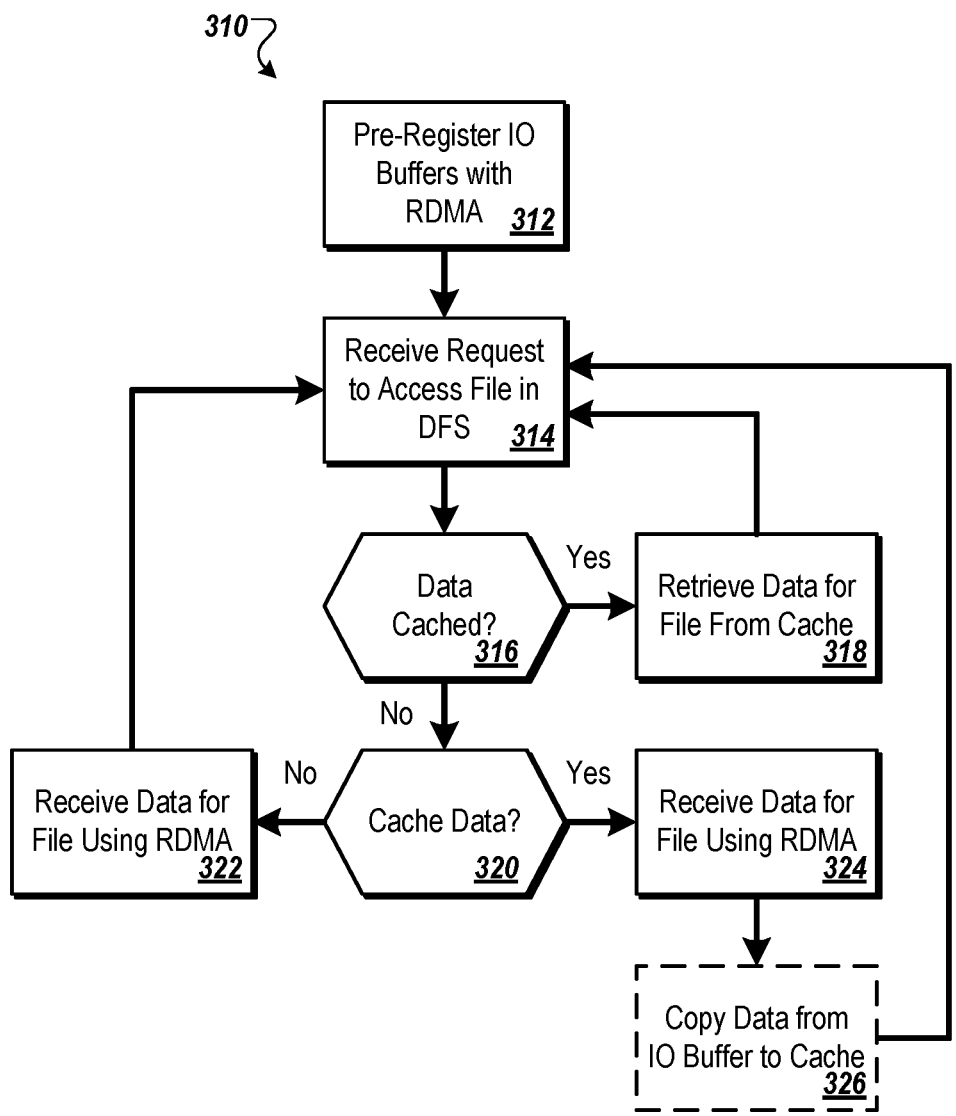

FIGS. 3A-B are flow charts that show examples of a first process 300 and a second process 310 for pre-registering memory regions for remote direct memory access in a distributed file system, in accordance with some aspects of the same disclosure. The first process 300 and the second process 310 may be performed, for example, by a system such as the system 100 or the system 200. For clarity of presentation, the description that follows uses the system 100 and the system 200 as examples for describing the first process 300 and the second process 310. However, another system, or combination of systems, may be used to perform the first process 300 and the second process 310.

The first process 300 begins, at box 302, with pre-registering, by a processing device at a client device, multiple memory regions at the client device for input/output (IO) buffers of a remote direct memory access (RDMA) interface at the client device. Pre-registering involves providing the RDMA interface with a memory region to be used as a buffer for RDMA communications. The pre-registration reserves the memory region with the operating system or kernel at the client device so that the memory region is not modified or assigned to another application while it is being used by the RDMA interface. The client device accesses multiple server devices of a distributed file system using the RDMA interface. For example, the client application 202 may pre-register memory regions for the buffers 204 with the RDMA interface 206 at the client device 102.

At box 304, a request to access a file in the distributed file system is received from an application at the client device. For example, the client application 202 may receive a request for a file in the distributed file system 108 from the user application 208.

At box 306, a first IO buffer among the IO buffers is designated as a cache for data from the file. For example, the client application 202 may designate one of the buffers 204 for use as the cache 234. The client application 202 may be configured to cache particular data or files for a particular amount of time after having been retrieved from the distributed file system 108.

At box 308, the data for the file is received from the distributed file system in the first IO buffer using the RDMA interface. For example, the client application 202 may indicate to the RDMA interface 206 at the client device 102 which of the buffers 204 to use, such as the first IO buffer, for the data transfer. The RDMA interface 206 at the client device 102 then exchanges the address of the selected buffer with the RDMA interface 228 at the server device 104a. The server device 104a then communicates through the RDMA interfaces to place the data directly in the buffer at the client device 102. For example, the client device 102 may receive the data for the file in the cache 234 from the RDMA interface 228 at the server device 104a. The data in the cache 234 may be placed in one of the buffers 204 in the cache 234 that were pre-registered by the client application 202.

The second process 310 begins, at box 312, with pre-registering multiple memory regions in a memory at a client device for input/output (IO) buffers of an RDMA interface at the client device. The client device accesses multiple server devices of a distributed file system using the RDMA interface. For example, the client application 202 may pre-register the buffers 204 with the RDMA interface 206 at the client device 102.

At box 314, a request is received to access a file in the distributed file system from an application at the client device. For example, the client application 202 may receive a request to access a file in the distributed file system 108 from the user application 208 at the client device 102.

At box 316, if data for the file has already been cached at the client device, then at box 318 the data may be retrieved from the cache without receiving the data from the servers in the distributed file system. After retrieving the data from the cache, the second process 310 may, at box 314, receive another request to access a file in the distributed file system. In some implementations, the client device may first send a request to the distributed file system to determine if the data for the file in the distributed file system has changed since the data for the file was cached before using the cached data for the file. For example, the client application 202 may receive a request from the user application 208 to access a file in the distributed file system 108. The client application 202 may determine that data for the file has already been cached and in response the client application 202 may provide the cached data to the user application 208.

At box 320, if data for the file is not to be cached at the client device, then at box 322 data for the file is received in an IO buffer (that has not been designated for caching) among the IO buffers from the distributed file system using the RDMA interface. After receiving the data in the buffer, the second process 310 may, at box 314, receive another request to access a file in the distributed file system. For example, the client device 102 may receive data for a file from the storage unit 236 in the data storage device 110a at the server device 104a through the RDMA interface 206 and the server device 104a may place the data in one of the buffers 204 specified by the client application 202.

If, at box 320, the data for the file is to be cached at the client device, then at box 324 data for the file is received in an IO buffer among the IO buffers that is designated by the client application as a cache for that data. Alternatively, at box 324, data for the file may be received in an IO buffer (that has not been designated for caching) among the IO buffers and at box 326 the data may be copied to the cache. After receiving the data in the buffer and/or copying the data to the cache, the second process 310 may, at box 314, receive another request to access a file in the distributed file system.

For example, the client device 102 may receive data for a file from the storage unit 236 in the data storage device 110a at the server device 104a through the RDMA interface 206 and the server device 104a may place the data in one of the buffers 204 specified by the client application 202 as the cache 234. In some implementations, the IO buffers include a first set of IO buffers (including the first IO buffer) used to cache data received from the distributed file system and a second set of IO buffers that are not used to cache data received from the distributed file system.

In another example, the client device 102 may receive data for a file from the storage unit 236 in the data storage device 110a at the server device 104a through the RDMA interface 206, the server device 104a may place the data in one of the buffers 204 specified by the client application 202, and the client application 202 may copy the data to the cache 234. In some implementations, the client application copies the data in the background using a thread that is separate from a thread that receives the data from the distributed file system.

For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events. Additionally, it should be appreciated that the processes disclosed in this specification are capable of being stored on an article of manufacture to facilitate transporting and transferring such processes to computing devices. The term article of manufacture, as used herein, is intended to encompass a computer program accessible from a computer-readable device or storage media.

Figure 4:
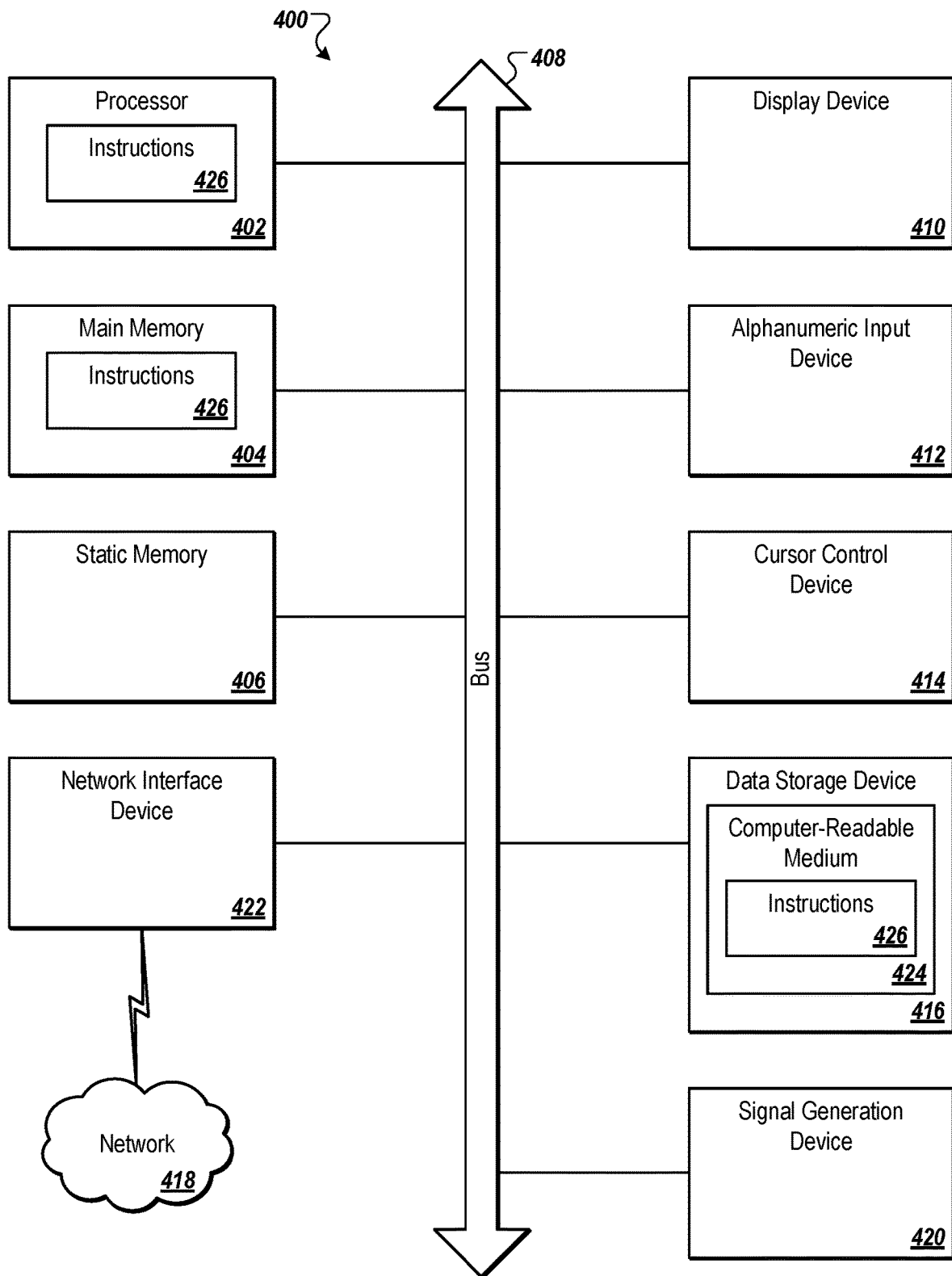
FIG. 4 is a schematic diagram that shows an example of a computing system.

FIG. 4 is a schematic diagram that shows an example of a machine in the form of a computer system 400. The server devices 104a-c or the client device 102 may include the computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term machine shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the client application 202, the server application 114, and/or the storage unit application 116 for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the client application 202, the server application 114, and/or the storage unit application 116 embodying any one or more of the methodologies or functions described herein. The sets of instructions 426 of the client application 202, the server application 114, and/or the storage unit application 116 may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term computer-readable storage medium can include a single medium or multiple media (e.g., a centralized or distributed database, and/or associated caches and servers) that store the sets of instructions 426. The term computer-readable storage medium can include any medium that is capable of storing, encoding or carrying a set of instructions for execution by the machine and that cause the machine to perform any one or more of the methodologies of the present disclosure. The term computer-readable storage medium can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as identifying, providing, enabling, finding, selecting or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words example or exemplary are used herein to mean serving as an example, instance, or illustration. Any aspect or design described herein as example or exemplary is not necessarily to be construed as preferred or advantageous over other aspects or designs. Rather, use of the words example or exemplary is intended to present concepts in a concrete fashion. As used in this application, the term or is intended to mean an inclusive or rather than an exclusive or. That is, unless specified otherwise, or clear from context, X includes A or B is intended to mean any of the natural inclusive permutations. That is, if X includes A; X includes B; or X includes both A and B, then X includes A or B is satisfied under any of the foregoing instances. In addition, the articles a and an as used in this application and the appended claims should generally be construed to mean one or more unless specified otherwise or clear from context to be directed to a singular form. Moreover, use of the term an embodiment or one embodiment or an implementation or one implementation throughout is not intended to mean the same embodiment or implementation unless described as such. The terms first, second, third, fourth, etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
pre-registering, at a client device, one or more input/output (IO) buffers for a remote direct memory access (RDMA) interface at the client device, wherein pre-registering comprises specifying multiple levels of access for the one or more IO buffers due to a level of access for the IO buffers determined in view of a level of access subsequently used by an application executed by the client device, wherein the level of access is unknown at a time the IO buffers are pre-registered;
responsive to pre-registering the one or more IO buffers at the client device, providing the application executed by the client device with access to a distributed file system through the RDMA interface;
determining whether data of a requested file in the distributed file system has been designated for caching;
responsive to determining that the data of the requested file in the distributed file system has been designated for caching, designating a first IO buffer among the IO buffers as a cache for the data of the file; and
receiving, via the RDMA interface and from the distributed file system, the data of the file for the first IO buffer.

2. The method of claim 1, wherein the one or more IO buffers are pre-registered during initialization of the RDMA interface.

3. The method of claim 1, wherein the one or more IO buffers comprise a plurality of IO buffers that comprise a first set of IO buffers designated for caching data received from the distributed file system and a second set of IO buffers that are not designated for caching the data received from the distributed file system, and wherein the first set of IO buffers comprises the first IO buffer.

4. The method of claim 3, wherein the data of the file received for the first IO buffer is used for a subsequent request to access the file from the client device, and wherein the method further comprises determining that the data of the file in the first IO buffer relative to the data of the file in the distributed file system has not changed prior to using the data of the file in the first IO buffer.

5. The method of claim 1, further comprising:
receiving a request to access the file in the distributed file system from the application at the client device, wherein the request to access the file comprises a system call or a file operation of an operating system, and wherein the system call or the file operation accesses a virtual file system.

6. A system comprising:
a remote direct memory access (RDMA) interface at a client device;
a memory, at the client device, comprising multiple memory regions; and
a processing device, at the client device, to communicate with the RDMA interface and the memory, the processing device to:
pre-register a plurality of input/output (IO) buffers for the RDMA interface at the client device;
responsive to pre-registering the plurality of IO buffers at the client device, provide an application executed by the client device with access to a distributed file system through the RDMA interface;
determine whether data of a requested file in the distributed file system has been designated for caching;
responsive to determining that the data of the requested file in the distributed file system has been designated for caching;
designate a first IO buffer among the plurality of IO buffers as a cache for the data of the file, wherein the first IO buffer is included in a first set of IO buffers of the plurality of IO buffers that are designated for caching data received from the distributed file system; and
receive, via the RDMA interface and from the distributed file system, the data of the file for the first IO buffer; and
responsive to determining that the data of the requested file in the distributed file system has not been designated for caching, cause the data of the file to be stored in a second IO buffer among the plurality of IO buffers, wherein the second IO buffer is included in a second set of IO buffers of the plurality of IO buffers that are not designated for caching data received from the distributed file system.

7. The system of claim 6, wherein at least one of the plurality of IO buffers is pre-registered during initialization of the RDMA interface.

8. The system of claim 6, wherein the data of the file received for the first IO buffer is used for a subsequent request to access the file from the client device, and wherein the processing device is further to:
determine that the data of the file in the first IO buffer relative to the data of the file in the distributed file system has not changed prior to using the data of the file in the first IO buffer.

9. The system of claim 6, wherein pre-registering comprises specifying multiple levels of access for the plurality of IO buffers due to a level of access for the plurality of IO buffers, wherein the level of access for the plurality of IO buffers is determined in view of a level of access subsequently used by the application not yet being known at a time the plurality of IO buffers are pre-registered.

10. A non-transitory, computer readable medium having instructions that, when executed by a processing device, cause the processing device to:
pre-register, at a client device, a plurality of input/output (IO) buffers for a remote direct memory access (RDMA) interface at the client device;
responsive to pre-registering the plurality of IO buffers at the client device, provide an application executed by the client device with access to a distributed file system through the RDMA interface;
determine whether data of a requested file in the distributed file system has been designated for caching;
responsive to determining that the data of the requested file in the distributed file system has been designated for caching;
designate a first IO buffer among the plurality of IO buffers as a cache for the data of the file, wherein the first IO buffer is included in a first set of IO buffers of the plurality of IO buffers that are designated for caching data received from the distributed file system; and receive, via the RDMA interface and from the distributed file system, the data of the file for the first IO buffer; and responsive to determining that the data of the requested file in the distributed file system has not been designated for caching, cause the data of the file to be stored in a second IO buffer among the plurality of IO buffers, wherein the second IO buffer is included in a second set of IO buffers of the plurality of IO buffers that are not designated for caching data received from the distributed file system.

11. The non-transitory, computer readable medium of claim 10, wherein at least one of the plurality of IO buffers is pre-registered during initialization of the RDMA interface.

12. The non-transitory, computer readable medium of claim 10, wherein the data of the file received for the first IO buffer is used for a subsequent request to access the file from the client device, and wherein the processing device is further to:

determine that the data of the file in the first IO buffer relative to the data of the file in the distributed file system has not changed prior to using the data of the file in the first IO buffer.

13. The non-transitory, computer readable medium of claim 10, wherein pre-registering comprises specifying multiple levels of access for the plurality of IO buffers, wherein the level of access for the plurality of IO buffers is determined in view of a level of access for the plurality of IO buffers due to a level of access subsequently used by the application not yet being known at a time the plurality of IO buffers are pre-registered.

14. The non-transitory, computer readable medium of claim 10, wherein the processing device is further to:

receive a request to access the file in the distributed file system from the application at the client device, wherein the request to access the file comprises a system call or a file operation of an operating system, and wherein the system call or the file operation accesses a virtual file system.

\* \* \* \* \*